US008538278B2

(12) United States Patent
Batshon et al.

(10) Patent No.: US 8,538,278 B2
(45) Date of Patent: Sep. 17, 2013

(54) SUPERIMPOSED TRAINING AND DIGITAL FILTERING COHERENT OPTICAL RECEIVERS

(75) Inventors: Hussam G. Batshon, Tucson, AZ (US); Lei Xu, Princeton Junction, NJ (US); Ting Wang, Princeton, NJ (US); Ivan B. Djordjevic, Tucson, AZ (US)

(73) Assignee: NEC Laboratorie America, Inc, Princeton, NJ (US)

( * ) Notice: Subject to any disclaimer, the term of this patent is extended or adjusted under 35 U.S.C. 154(b) by 596 days.

(21) Appl. No.: 12/702,895

(22) Filed: Feb. 9, 2010

(65) Prior Publication Data
US 2011/0194855 A1  Aug. 11, 2011

(51) Int. Cl.
*H04B 10/06*  (2011.01)
(52) U.S. Cl.
USPC .......................... 398/205; 398/207; 398/208
(58) Field of Classification Search
USPC ...................... 398/65–79, 202–208
See application file for complete search history.

(56) References Cited

U.S. PATENT DOCUMENTS

| | | | | |
|---|---|---|---|---|
| 5,838,740 | A * | 11/1998 | Kallman et al. | 375/346 |
| 2005/0196176 | A1* | 9/2005 | Sun et al. | 398/152 |
| 2008/0063118 | A1* | 3/2008 | Li | 375/340 |
| 2009/0324223 | A1* | 12/2009 | Liu | 398/65 |
| 2010/0119241 | A1* | 5/2010 | Yang et al. | 398/208 |

OTHER PUBLICATIONS

Godard, D., "Self-Recovering Equalization and Carrier Tracking in Two-Dimensional Data Communication Systems", IEEE Transactions on Communications, Nov. 1980, vol. Com-28, No. 11, pp. 1867-1975.
Goldfarb, G., et al., "Chromatic Dispersion Compensation Using Digital IIR Filtering With Coherent Detection", IEEE Photonics Technology Letters, Jul. 2007, vol. 19, No. 13, pp. 969-971.
He, S., et al., "On Superimposed Training for MIMO Channel Estimation and Symbol Detection", IEEE Transaction on Signal Processing, Jun. 2007, vol. 55, No. 6, pp. 3007-3021.
Picchi, G., et al., "Blind Equalization and Carrier Recovery Using a "Stop-and-Go" Decision-Directed Algorithm", IEEE Transactions on Communications, Sep. 1987, vol. Com-35, No. 9, pp. 877-887.
Savory, S., "Digital Filters for Coherent Optical Receivers", Optics Express, Jan. 2008, vol. 16, No. 2, 14 Pages.
Tseng, C., "Design of IIR Digital All-Pass Filters Using Least PTH Phase Error Criterion", IEEE Transactions on Circuit and Systems, Sep. 2003, vol. 50, No. 9., pp. 653-656.

(Continued)

*Primary Examiner* — Dzung Tran
(74) *Attorney, Agent, or Firm* — Joseph Kolodka

(57) ABSTRACT

In a polarization-multiplexing optical communications system, a method and system for coherent reception of polarization-multiplexed optical communications. Training and data sequences are recovered from a plurality of orthogonally polarized signals, such that training and data sequences may be used on a single channel without loss of spectral efficiency. This is accomplished by estimating a channel response for each orthogonally polarized signal based on the mean of the signal and distinguishing between a data sequence and a training sequence in each orthogonally polarized signal. Such distinguishing is accomplished according to an iterative linear minimum mean-square equalization based on the respective channel response estimate.

13 Claims, 5 Drawing Sheets

(56) References Cited

OTHER PUBLICATIONS

Dandawate, A.V., et al. "Asymptotic Theory of Mixed Time Averages and Kth-Order Cyclic-Moment and Cumulant Statistics", IEEE Transactions on Information Theory, Jan. 1995, vol. 41, No. 1, pp. 216-232.

Tugnait, J., et al., "On Superimposed Training for Channel Estimation: Performance Analysis, Training Power Allocation, and Frame Synchronization", IEEE Transactions on Signal Processing, Feb. 2006, vol. 54, No. 2, pp. 752-765.

Zhu, H., et al., "Pilot Embedding for Joint Channel Estimation and Data Detection in MIMO Communciation Systems", IEEE Communications Letters, Jan. 2003, vol. 7, No. 1, pp. 30-32.

* cited by examiner

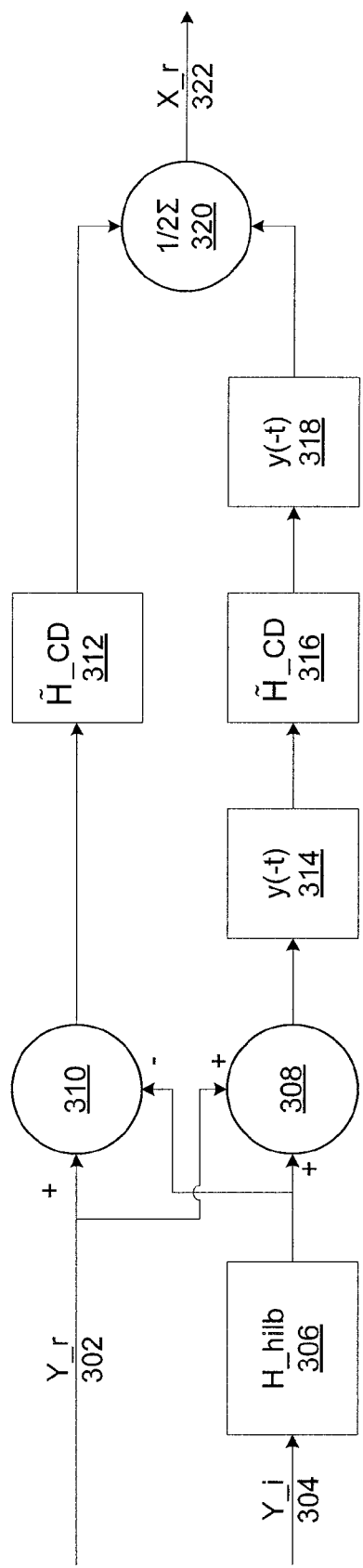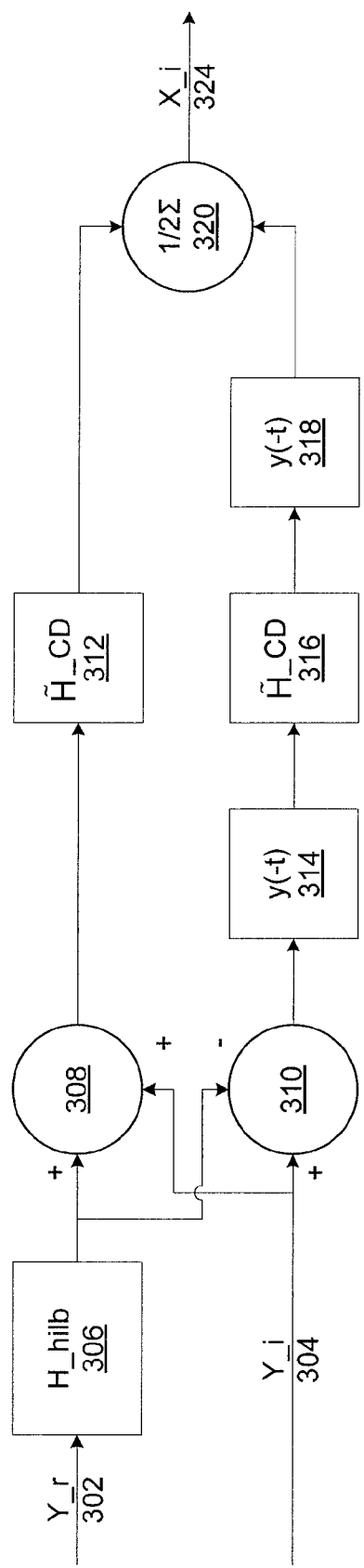

SUPERIMPOSED TRAINING AND DIGITAL FILTERING COHERENT OPTICAL RECEIVERS

BACKGROUND

1. Technical Field

The present invention relates to optical communication systems and methods and, more particularly, systems and methods for coherent optical receivers in polarization multiplexed quadrature phase shift keyed systems.

2. Description of the Related Art

Continuous expansion of network applications results in a continuous demand on transmission capacities. To keep up with these demands, one can increase the transmission rates of the transceivers, or optimize the utilization of currently available components. In optical networks, increasing the transceivers' transmission rates augments the susceptibility of the transmitted signals to degradation over extended transmission lengths. This is due to the fact that, at higher data rates, the signal quality degrades severely as a result of linear and nonlinear impairments.

Chromatic dispersion (CD) and polarization mode dispersion (PMD) are the most dominant optical-channel distortion effects. CD is usually a much larger impairment than PMD, and can be a significant distortion even at relatively low data rates on long fibers.

CD is an effect based either in the refractivity of a medium or in the geometric properties of the medium, which cause different frequencies of electromagnetic radiation to travel through the medium at different rates. The result is that a pulse of light spreads out along the fiber as it travels over great distances. The longer the fiber over which a pulse travels, the wider the pulse spreads out. Difficulties arise when the resulting energy from a pulse begins to interfere with that of an adjacent pulse. This interference causes inter-symbol interference in the electrical domain.

CD effects are determined by each optical fiber, and can typically be considered stable over time. Because of its stability, CD can be compensated for using a passive device (e.g., medium having dispersion effects which counteract the dispersion of the transmission medium). However, such passive devices have drawbacks, in that they substantially reduce the optical signal-to-noise ratio.

PMD, meanwhile, is an effect based on the defects of the transmission medium and cannot be compensated for passively. In an ideal medium, signals traveling in orthogonal polarizations will travel at the same speed. In real media, however, defects cause random differences in the speeds of the respective polarizations, causing the polarizations to drift with respect to one another. PMD, in contrast to CD, is not a significant problem for most fibers until data rates exceed 10 Gb/s. However, in contrast to CD, PMD on long fibers changes randomly over time. The dynamic characteristic of PMD makes it a difficult problem for high-speed optical transmissions.

Polarization multiplexing (PolMux) with quadrature phase shift keying (QPSK) has been investigated as one avenue of research for boosting spectral efficiency and transmission rates. However, coherent detection in such systems has been considered too complex, due to phase- and polarization-tracking concerns, to be practical. Previous work has used digital filters with blind equalization to estimate transmission channels. Unfortunately, blind equalization lacks the reliability of a trained system. Conventional trained systems operate by time-multiplexing a training signal with data. This reduces the spectral efficiency.

SUMMARY

In response to the growing need for high-speed optical communications, embodiments of the present principles provide coherent reception with superimposed training sequences. Embodiments of the present principles include a polarization multiplexing, optical receiver that includes a polarization beam splitter for splitting a received optical signal into two orthogonal polarizations and a training/data recovery module for extracting a superimposed training signal and data signal from the polarized beams.

Embodiments of the present principles further include a method for coherent reception of polarization-multiplexed optical communications, including the steps of splitting a received signal into orthogonally polarized signals and recovering superimposed training and data signals from the signals.

Embodiments of the present principles further include a polarization-multiplexing, optical transmitter including a plurality of modulators for modulating data sequences and training sequences onto respective signals, a plurality of power combiners for combining training sequences with data sequences into orthogonal polarizations, and a polarization beam combiner for combining two orthogonally polarized signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3a shows a block diagram of a CD compensation module that produces the real component of an input signal.

FIG. 3b shows a block diagram of a CD compensation module that produces the imaginary component of an input signal.

DETAILED DESCRIPTION OF PREFERRED EMBODIMENTS

Superimposed training provides a technique for using coherent detection without sacrificing spectral efficiency. The present principles describe a technique for using superimposed training in a polarization multiplexing (PolMux) quadrature phase-shift keyed (QPSK) system.

Embodiments described herein may be entirely hardware, entirely software or including both hardware and software elements. In a preferred embodiment, the present invention is implemented in a combination of hardware and software, where software includes but is not limited to firmware, resident software, microcode, etc.

Figure 1:
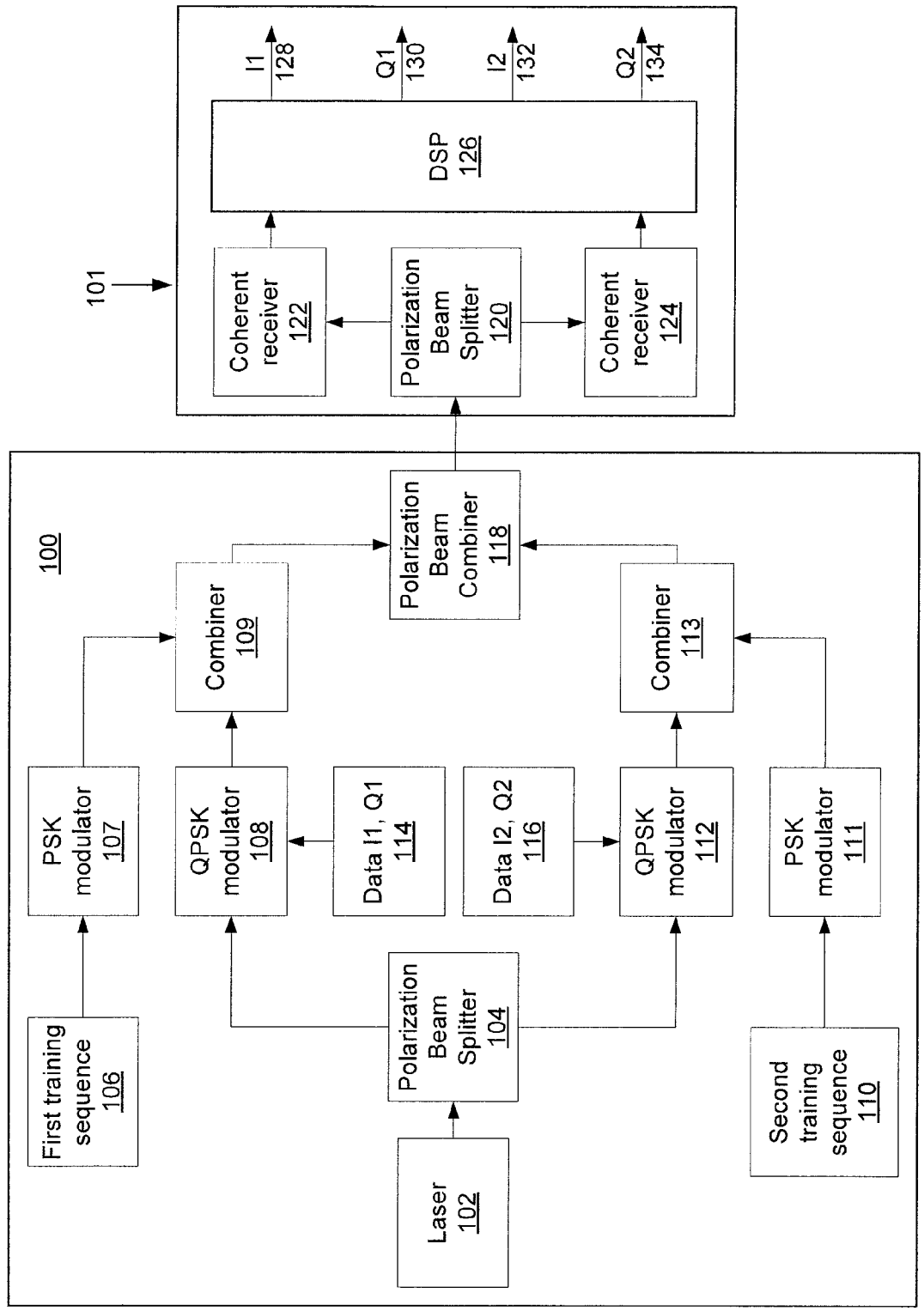
FIG. 1 shows a block diagram of an optical transmitter/receiver system that employs superimposed training signals.

Referring now to the drawings in which like numerals represent the same or similar elements and initially to FIG. 1, an optical communication system is shown comprising a transmitter 100 and a receiver 101. The transmitter comprises a laser 102 which forms a carrier signal. The laser is polarized at 45°, such that when the beam is then split in polarization beam splitter 104, it produces two orthogonal polarizations of equal intensity. The polarized beams then feed into QPSK modulators 108 and 112. Although the present embodiments are described in terms of a QPSK modulation scheme, other modulation schemes are available and may be employed according to the present principles.

QPSK modulators 108 and 112 receive data sequences 114 and 116, comprising respective in-phase and quadrature signals that represent the substantive data which is to be modulated onto the polarized laser beams. The training sequences 106 and 110 first pass through their own PSK modulators 107 and 111 and are later combined with the modulated data sequences of QPSK modulators 114 and 116. The PSK modulators 107 and 111 put the training sequences 108 and 110 into a form that may be additively combined with the modulated data sequences 114 and 116. Although PSK modulation is used in this exemplary embodiment, the present disclosure is not intended to limit the inventive principles to such an embodiment.

The QPSK modulators 108 and 112 modulate the data sequences 114 and 116. The modulated data sequences are additively combined with the modulated training sequences in power combiners 109 and 113 to produce a polarized optical signal with superimposed data and training sequences. The modulated, polarized signals are then combined in polarization beam combiner 118 and are subsequently transmitted over a fiber (not shown). As noted above, QPSK modulators are used for exemplary purposes and are not intended to limit the present principles to QPSK implementations.

The transmitted optical signals are received at receiver 101. The incoming optical signal is split at polarization beam splitter 120 into two orthogonal polarized optical signals. Due to polarization mode dispersion (PMD) and other polarization dependent impairments (PDIs), the two optical signals produced by polarization beam splitter 120 will be rotated with respect to the two polarized transmitted signals. The PDIs change continuously in an unpredictable way. Adaptive filtering may be employed to compensate for the ever-changing PDIs.

The polarized beams are passed to coherent receivers 122 and 124. These receivers may comprise 90° hybrid coherent receivers that produce a complex signal. The complex signal is then passed to a digital signal processing (DSP) module 126 which compensates for both CD as well as PDIs. The DSP produces four outputs, I1 128, Q1 130, I2 132, and Q2 134 representing the data sequences 114 and 116 input to the transmitter 100.

Figure 2:
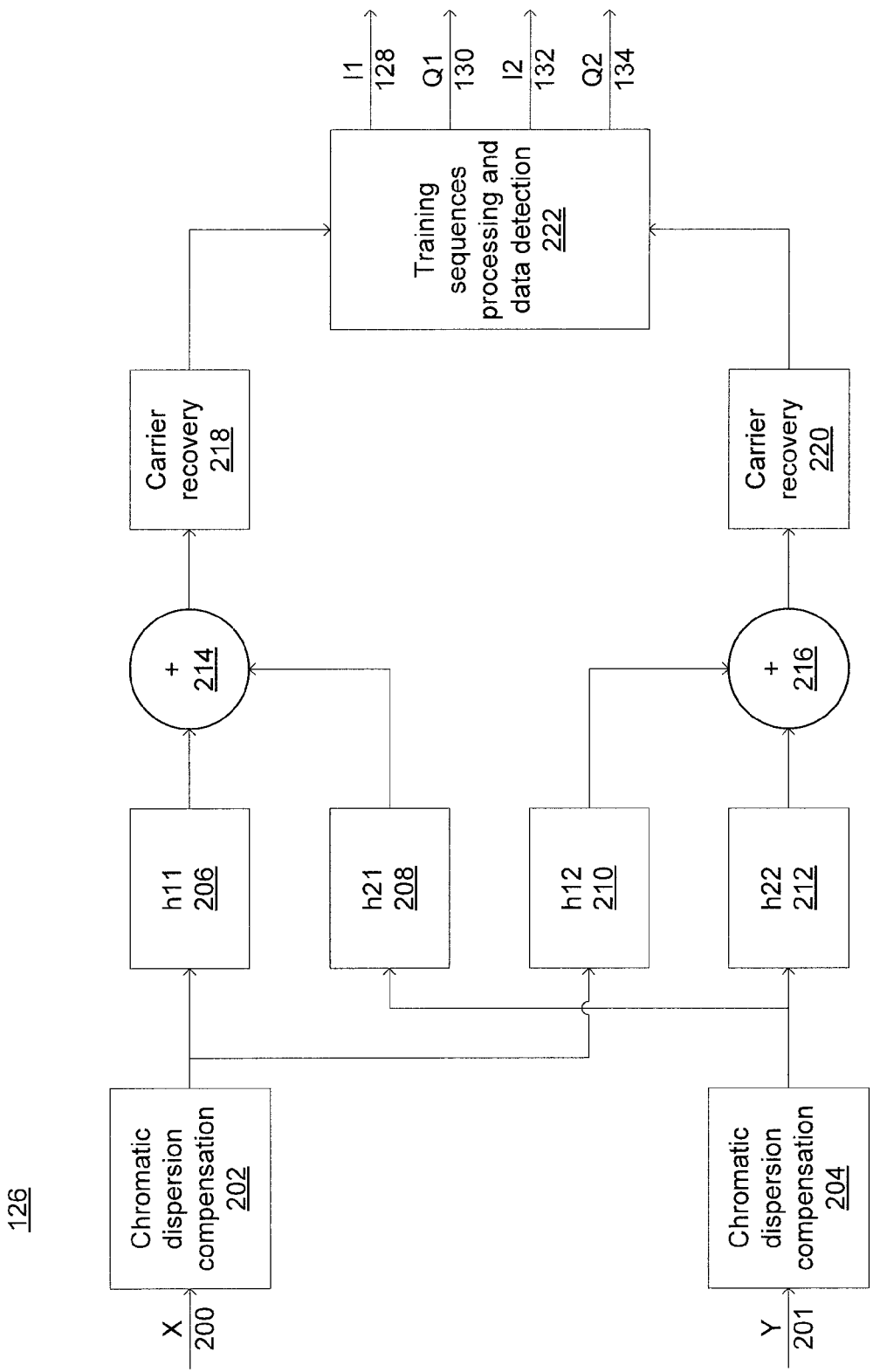
FIG. 2 shows a block diagram of an optical receiver that compensates for chromatic dispersion (CD) and polarization dependent impairments (PDI).

Referring now to FIG. 2, a detailed diagram of the DSP module 126 is shown. Complex inputs 200 and 201 pass through CD compensation modules 202 and 204. The operation of the CD compensation modules is described in greater detail below with respect to FIGS. 3a and 3b. Each CD compensation module produces two outputs, representing real and imaginary components of the signal respectively.

After CD compensation, polarization dependent effects can be removed from the signal. These effects vary due to polarization dependent loss and polarization mode dispersion. Adaptive filtering can be used to correct for such time-varying effects. The outputs of the CD compensation modules 202 and 204 pass to adaptive filters 206-212. CD compensation module 202's output goes to filters 206 and 210, while module 204's output goes to filters 208 and 212. The output of the filters are then summed, with filters 206 and 208 being summed in adder 214 and filters 210 and 212 being summed in adder 216. The coefficients of the adaptive filters are updated frequently based on the magnitude of the error between the received signals and a required modulus. Carrier recovery is performed by the compensation of any phase and frequency mismatch between the incoming signal and the local oscillator of the coherent detector during the iterative process.

In order to update the adaptive filters, for input signals, $s_k(n)$, and output signals $x_k(n)$ for k=1,2, for both polarization, the relations are given as follows:

$$x_1(n) = \sum_{m=0}^{M-1} h_{11}(m)s_1(n-m) + h_{12}(m)s_2(n-m)$$

$$x_2(n) = \sum_{m=0}^{M-1} h_{21}(m)s_1(n-m) + h_{22}(m)s_2(n-m)$$

where $h_{pq}$ for p,q $\in \{1,2\}$, are adaptive filters each of length M. For a PolMux-QPSK system, adapting the system equalizer is better performed by a constant modulus algorithm to exploit the fact that each polarization has a constant modulus. In this algorithm, the equalizer minimizes the error in magnitude in the mean square sense. The adaptive filters' coefficients are updated relative to the magnitude of the error between the received signals and the required modulus, dependent on the launching power of the system. The required modulus is a measure of the constant modularity of the transmitted signal. The filter coefficients are initialized with zeros except the central taps of $h_{11}$ and $h_{21}$. Updating the coefficients is done as follows:

$$h_{11} \rightarrow h_{11} + \mu \cdot (1-|x_1|^2) \cdot x_1 \cdot s_1^* \quad h_{12} \rightarrow h_{12} + \mu \cdot (1-|x_1|^2) \cdot x_1 \cdot s_2^*$$

$$h_{21} \rightarrow h_{21} + \mu \cdot (1-|x_2|^2) \cdot x_2 \cdot s_1^* \quad h_{22} \rightarrow h_{22} + \mu \cdot (1-|x_2|^2) \cdot x_2 \cdot s_2^*$$

where $\mu$ is the convergence parameter. $\mu$ is a value, usually less than 0.1, that is used to control the speed and the realization of convergence. $s_k^*$ is the complex conjugate of the input signal at channel k.

Finally, block 222 performs data detection and training sequences processing on the CD- and PMD-corrected signals. The training sequence is used to identify the source channel of a given data sequence which, after detection the data sequences 114 and 116, may be completely interchanged. Block 222 produces four outputs, 128-134, representing the four data streams encoded in the optical transmission. Demodulation may be performed in the DSP block 222 or may be performed by a separate demodulator, not shown.

Referring now to FIGS. 3a and 3b, detailed diagrams of the real and the imaginary portions of a CD compensation module are shown. A CD compensation module such as those shown as 202 and 204 in FIG. 2 may comprise a real and an imaginary pathway, using the circuits of both FIGS. 3a and 3b respectively. The effect of the transmission channel is given as $Y(\omega) = X(\omega) H_{CD}(\omega)$, where $Y(\omega)$ is the received signal, $X(\omega)$ is the transmitted signal, and $H_{CD}(\omega)$ is a transformation that models the CD effect of the medium. At lower speeds, second order CD effects are too small to be a concern. With the present principles, however, it is possible to reach high enough transmission speeds that second order effects become significant. As such, the present principles advantageously take the second order effects of CD into account in the CD compensation modules.

The CD effect of the channel, taken to second order, can be modeled as $H_{CD}(\omega)$, the frequency response of the channel:

$$H_{CD}(\omega) = \exp\left(j\frac{\lambda_o^2 L\omega^2}{24\pi^2 c^2}(6\pi cD - S\lambda_o^2\omega - 2D\lambda_o\omega)\right) \quad (1)$$

where $\omega$ is the baseband radial frequency, $\lambda_0$ is the transmitter wavelength, D is the fiber dispersion parameter, S is the fiber dispersion slope, L is the propagation distance, and c is the speed of light. As can be readily seen, all of these parameters are static with respect to a particular transmission system, allowing for static compensation. It is also worth noting that the frequency response of the channel for the first order CD, $$H_{CD}(\omega) = \exp\left(j\frac{\lambda_o^2 DL\omega^2}{4\pi c}\right),$$

is not suited to the data rates that become possible with the present principles. Given the channel model, the chromatic dispersion can be reversed using an all-pass infinite impulse response filter.

Because $H_{CD}(\omega)$ is a constant amplitude, phase varying function, the inverse of the channel is simply the complex conjugate the of $H_{CD}(\omega)$. This produces an expression for the transmitted signal based on the received signal and the complex conjugate of $H_{CD}(\omega)$: $X(\omega)=Y(\omega)\cdot H^*_{CD}(\omega)$, which, after separating into real and imaginary values, becomes:

$$\begin{pmatrix} X_r \\ X_i \end{pmatrix} = \begin{pmatrix} H_{CD,r} & H_{CD,i} \\ -H_{CD,i} & H_{CD,r} \end{pmatrix} \cdot \begin{pmatrix} Y_r \\ Y_i \end{pmatrix} \quad (2)$$

Because the phase response of the channel is even, the channel response is expressed in monotonous phase response functions. This allows the design of a stable all-pass infinite impulse response (IIR) filter.

By defining $\tilde{H}_{CD}=H_{CD,r}-H_{hilb}\cdot H_{CD,i}$, where $H_{hilb}$ is the Hilbert transform, $H_{CD,r}$ is the real component of $H_{CD}$, and $H_{CD,i}$ is the imaginary component of $H_{CD}$, it becomes possible to design CD compensation modules for both the real and the imaginary parts of the transmitted signal.

Referring again to FIGS. 3a and 3b, the CD compensation module can be described in detail. Inputs $Y_r$ 302 and $Y_i$ 304 represent the real and imaginary components of the received signal, respectively. In FIG. 3a, the imaginary component 304 passes through Hilbert transformation 306, whereas in FIG. 3b the real component 302 is Hilbert transformed. The two components are then combined in adder 308 and subtracter 310, forming two distinct paths. One path goes through a CD compensation transformation at 312, while the other path has a CD compensation transformation 316 which is between two y(−t) blocks 314 and 318. The y(−t) blocks can be considered time reversal blocks. This translates into finding the complex conjugate in the frequency domain. The two paths are then combined in averager 320, which adds the outputs and divides by two. The averager 320 in FIG. 3a produces as output the real component of the input signal 322, whereas the averager 320 in FIG. 3b produces as output the imaginary component 324.

A PolMux system has two data channels, corresponding to the two polarizations. Each of these channels is assigned a specific training sequence peak-to-average power ratio of unity so that the channel estimation and data detection is straightforwardly achieved.

$s_k(n)$ is the kth polarization input signal where k=1 or 2. In superimposed training, $$s_k(n)=b_k(n)+c_k(n),$$

where $b_k(n)$ is the information sequence and $c_k(n)$ is a deterministic periodic training sequence. The information sequence is assumed to have a zero mean, and a finite alphabet. The training sequence, on the other hand, is designed to be a nonrandom periodic sequence with the period P.

The training sequences are designed to be polarization specific, with the ratio of peak-to-average power to be unity. Each of the training sequences is assigned a unique cycle frequency of the periodic hidden training sequence. This is done by choosing a period base sequence of a period $\tilde{P}$, and using it to build up the $k^{th}$ training sequence. The base training sequence is denoted by $\bar{c}_0(n)$. The kth training sequence which is of twice the length of the base sequence is determined by:

$$c_k(n) = \sum_{m'=0}^{P-1} c_{m'k} e^{j\left(\frac{2\pi m'}{P}\right)n}, \forall n$$

where, $$c_{m'k} = \begin{cases} \sigma_{ck}\bar{c}_{m0}, & \text{if } m' = k-1+2m, \quad m = \left\lfloor\frac{m'-k+1}{2}\right\rfloor \\ 0, & \text{elsewhere} \end{cases}$$

and $$\bar{c}_{m0} = \frac{1}{\tilde{P}}\sum_{n=0}^{\tilde{P}-1} \bar{c}_0(n) e^{-j\left(\frac{2\pi m}{\tilde{P}}\right)n},$$

where P is the length of the kth training sequence, and $$s_{ck}=\sqrt{P^{-1}\Sigma_{n=0}^{P-1}|c_k(n)|^2}.$$

The detection process takes place in two distinct parts. The first part is based on the first order statistics, as it observes the data sequences from the other polarization as interference. The fact that the training sequences are periodic and that the information sequence is zero mean leads to the conclusion that the mean of the received signal $y(n)=x_1(n)+x_2(n)+v(n)$ is periodic in n with the period P with distinct cycle frequencies, where $x_k(n)$ is the kth output signal, and $v(n)$ is the noise. Using this fact in addition to the known training sequences, and the zero mean data sequences, the mean of the received signal becomes a function of the training sequences, the channel response, and the mean of the noise, $$\tilde{y}(n) = y(n) - \sum_{k=1}^{2}\sum_{l=0}^{L} \hat{h}_k^{(1)}(l) c_k(n-1) - \hat{m}^{(1)},$$

where $\tilde{v}(n)$ is the mean of the received signal, L is the channel length, $\hat{h}_k^{(1)}$ is the initial estimate of the channel, and $\hat{m}^{(1)}$ is the estimate of the noise mean. Omitting the terms related to the noise, an initial estimate of the channel response is produced.

The second part of the detection process is based on iterative linear minimum mean-square error (LMMSE) equalization. First take the channel estimate derived above and use it to estimate the data sequences using the LMMSE equalizer with hard decision by the known alphabets. At this point, it is assumed that the estimated data sequences are correct. The estimated data sequences can then be used to estimate the multi-polarization channel. Given that $$\alpha_{mk} = \frac{2\pi}{P}(2m+k-1),$$

the $c_k(n)$ mentioned above can be formed as $$c_k(n) = \sum_{m=0}^{P-1} c'_{mk} e^{j\alpha_{mk}n}, \forall n$$

as well (where all variables are as defined earlier). Using these $c'_{mk}$, one can define $$C_k = \begin{bmatrix} c'_{1k} & 0 & \cdots & 0 \\ 0 & c'_{2k} & \ddots & \vdots \\ \vdots & \ddots & \ddots & 0 \\ 0 & \cdots & 0 & c'_{(P-1)k} \end{bmatrix} \begin{bmatrix} 1 & e^{-j\alpha_{1k}} & \cdots & e^{-j\alpha_{1k}L} \\ 1 & e^{-j\alpha_{2k}} & \cdots & e^{-j\alpha_{2k}L} \\ \vdots & \vdots & \vdots & \vdots \\ 1 & e^{-j\alpha_{(P-1)k}} & \cdots & e^{-j\alpha_{(P-1)k}L} \end{bmatrix} \otimes \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}.$$

The channel estimation is done as follows:

$$\hat{H}_k = (C_k^H C_k)^{-1} C_k^H \hat{D}_k$$

where $\hat{H}_k$ is the vector of the channel estimates, $\hat{D}_k$ is the vector of the $\hat{d}_{mk}$'s. $\hat{d}_{mk}$ is a function of the received signal and is defined as:

$$\hat{d}_{mk} = \frac{1}{T}\sum_{n=0}^{T-1} y(n)e^{-j\alpha_{mk}n}.$$

The H shown as a superscript of $C_k$ indicates that $C_k^H$ is the Hermitian transpose of $C_k$.

This process of iteratively updating the multi-polarization channel keeps repeating until reaching the point where the incremental difference between two successive estimates of the channel reaches a predefined threshold. This threshold value may depend on several factors, including the amount of time allowed to reach the estimate of the channel, the speed of convergence, and the allowed margin of error for the channel estimate. Usually, the smaller the threshold, the more time is required to realize the convergence, but the results produced are closer to the final convergence value.

Figure 4:
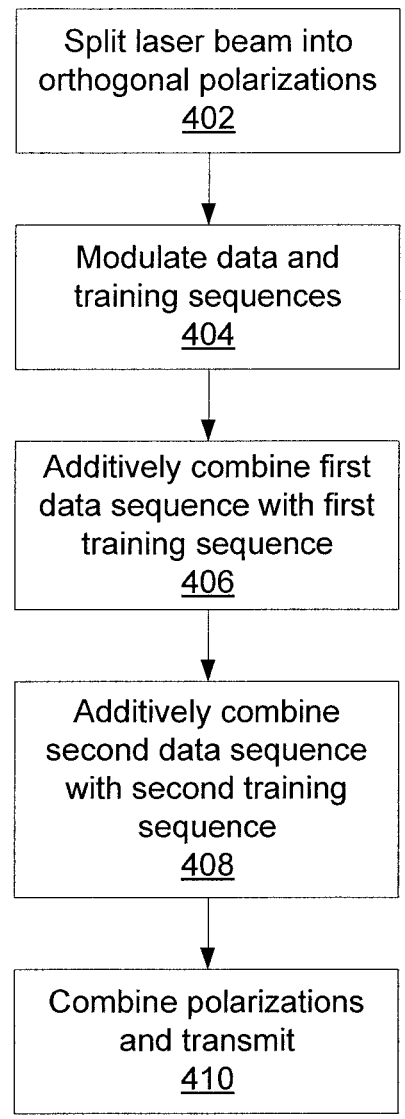
FIG. 4 shows a block/flow diagram outlining a system/method for transmitting optical, polarization multiplexed communications using a superimposed training signal.

Referring now to FIG. 4, a block/flow diagram is shown which outlines a method for transmitting polarization-multiplexed, optical communications with a superimposed training signal according to the present principles. First, a laser beam is split into two orthogonal polarizations in block 402. Next, data and training sequences are modulated onto respective orthogonal polarizations in block 404, such that a first data sequence and a first training sequence are modulated according to one polarization and a second data and a second training sequence are modulated according to another polarization, orthogonal to the first. In block 406, the first data sequence and the first training sequence are additively combined. In block 408, the second data sequence and the second training sequence are additively combined. The two orthogonal polarizations are then combined at block 410 and transmitted along an optical fiber.

Figure 5:
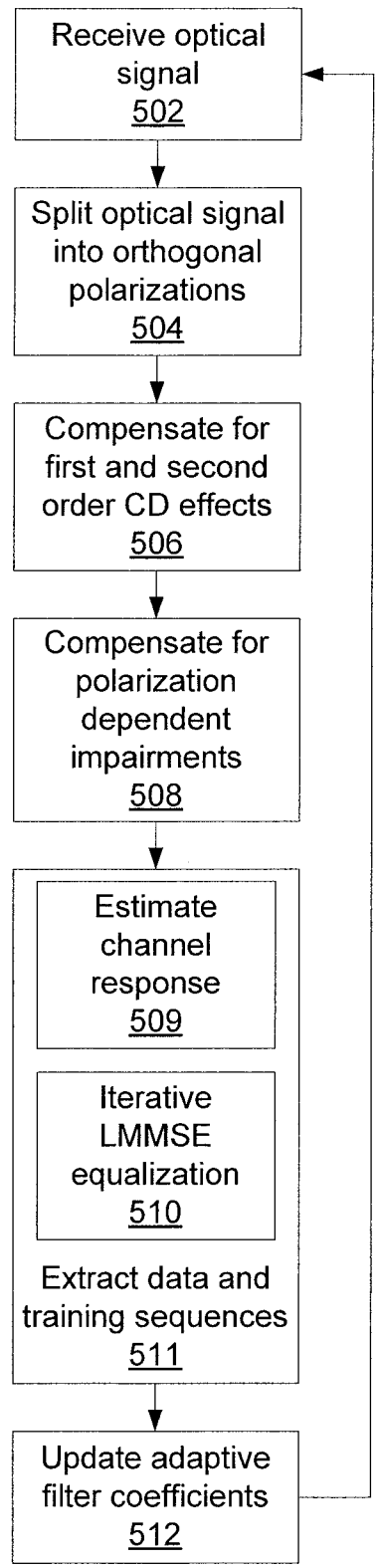
FIG. 5 shows a block/flow diagram outlining a system/method for receiving optical, polarization multiplexed communications using a superimposed training signal.

Referring to FIG. 5, a block/flow diagram is shown which outlines a method for receiving polarization-multiplexed, optical communications with a superimposed training signal according to the present principles. An optical signal having two data sequences encoded at orthogonal polarizations is received at block 502. The optical signal is then split into two orthogonal polarizations at block 504. Because of the time-dependent nature of PDI, the two polarized beams that are produced at block 504 will be varying in time with respect to the original polarizations. Additionally, the transmission medium will have produced CD effects.

Block 506 compensates for first- and second-order CD effects. This compensation may be performed using IIR filters as described above. The beams are then adaptively filtered at block 508 to remove the time-varying PDI.

Having compensated for the dispersion effects of the transmission medium, the data and training sequences can be extracted and processed at block 511. The detection of the data sequences includes estimating channel response based on the mean of the received signal at block 509 and iterative LMMSE equalization at block 510. The extracted training sequences can then be used to update the adaptive filter coefficients in block 512, thereby allowing the PDI compensation to track changes.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A polarization multiplexing, optical receiver comprising:
   a training/data recovery module configured to extract superimposed training signals and data signals from a plurality of orthogonally polarized signals such that training signals and data signals may be used on a single channel without loss of spectral efficiency, comprising:
   a channel response estimation module which estimates a channel response based on the mean of each orthogonally polarized signal; and
   a linear minimum mean-square error equalization module configured to distinguish a data sequence from a training sequence in each orthogonally polarized signal based on the respective channel response estimate;
   wherein said channel response estimation includes a channel estimation responsive to $\hat{H}_k = (C_k^H C_k)^{-1} C_k^H \hat{D}_k$ where $\hat{H}_k$ is the vector of the channel estimates, $\hat{D}_k$ is the vector of the $\hat{d}_{mk}$'s. $\hat{d}_{mk}$ is a function of a received signal and is based on $$\hat{d}_{mk} = \frac{1}{T}\sum_{n=0}^{T-1} y(n)e^{-j\alpha_{mk}n}.$$

where H shown as a superscript of $C_k$ indicates that $C_k^H$ is a Hermitian transpose of $C_k$, and an iterative updating of a multi-polarization channel keeps repeating until reaching the point where the incremental difference between two successive estimates of the multi-polarization channel reaches a predefined threshold.

2. The receiver of claim 1, further comprising a polarization beam splitter configured to split a received optical signal into two orthogonally polarized signals.

3. The receiver of claim 2, wherein the CD compensation modules are configured to compensate for second-order CD effects in the two orthogonally polarized signals.

4. The receiver of claim 2, wherein the CD compensation modules comprise a plurality of all-pass infinite impulse response filters.

5. The receiver of claim 1, further comprising a plurality of chromatic dispersion (CD) compensation modules.

6. The receiver of claim 1, further comprising a plurality of finite impulse response filters configured to remove polarization-dependent impairments (PDIs) from each orthogonally polarized signal.

7. The receiver of claim 6, wherein the finite impulse response filters are updated to reflect the time-varying PDIs.

8. A method for coherent reception of polarization-multiplexed optical communications, comprising:
recovering superimposed training and data sequences from a plurality of orthogonally polarized signals, such that training and data sequences may be used on a single channel without loss of spectral efficiency, by:
estimating a channel response for each orthogonally polarized signal based on the mean of the signal; and
distinguishing between a data sequence and a training sequence in each orthogonally polarized signal according to iterative linear minimum mean-square equalization based on the respective channel response estimate;
wherein said channel response estimate includes a channel estimation responsive to $\hat{H}_k = (C_k^H C_k)^{-1} C_k^H \hat{D}_k$ where $\hat{H}_k$ is the vector of the channel estimates, $\hat{D}_k$ is the vector of the $\hat{d}_{mk}$'s. $\hat{d}_{mk}$ a function of a received signal and is based on $$\hat{d}_{mk} = \frac{1}{T}\sum_{n=0}^{T-1} y(n)e^{-j\alpha_{mk}n}.$$

where H shown as a superscript of $C_k$ indicates that $C_k^H$ is a Hermitian transpose of $C_k$, and an iterative updating of a multi-polarization channel keeps repeating until reaching the point where the incremental difference between two successive estimates of the multi-polarization channel reaches a predefined threshold.

9. The method of claim 8, further comprising the step of splitting a received signal into two orthogonally polarized signals.

10. The method of claim 9, wherein said step of compensating includes compensating for second-order CD effects.

11. The method of claim 9, further comprising the step of updating the PDI compensation to reflect time-varying PDIs.

12. The method of claim 8, further comprising the step of compensating for chromatic dispersion (CD) effects.

13. The method of claim 8, further comprising the step of compensating for polarization-dependent impairments (PDIs) in each orthogonally polarized signals.

* * * * *